Oct. 21, 1952   F. B. MILLER   2,614,388
POWER TRANSMISSION
Filed Jan. 8, 1948   2 SHEETS—SHEET 1
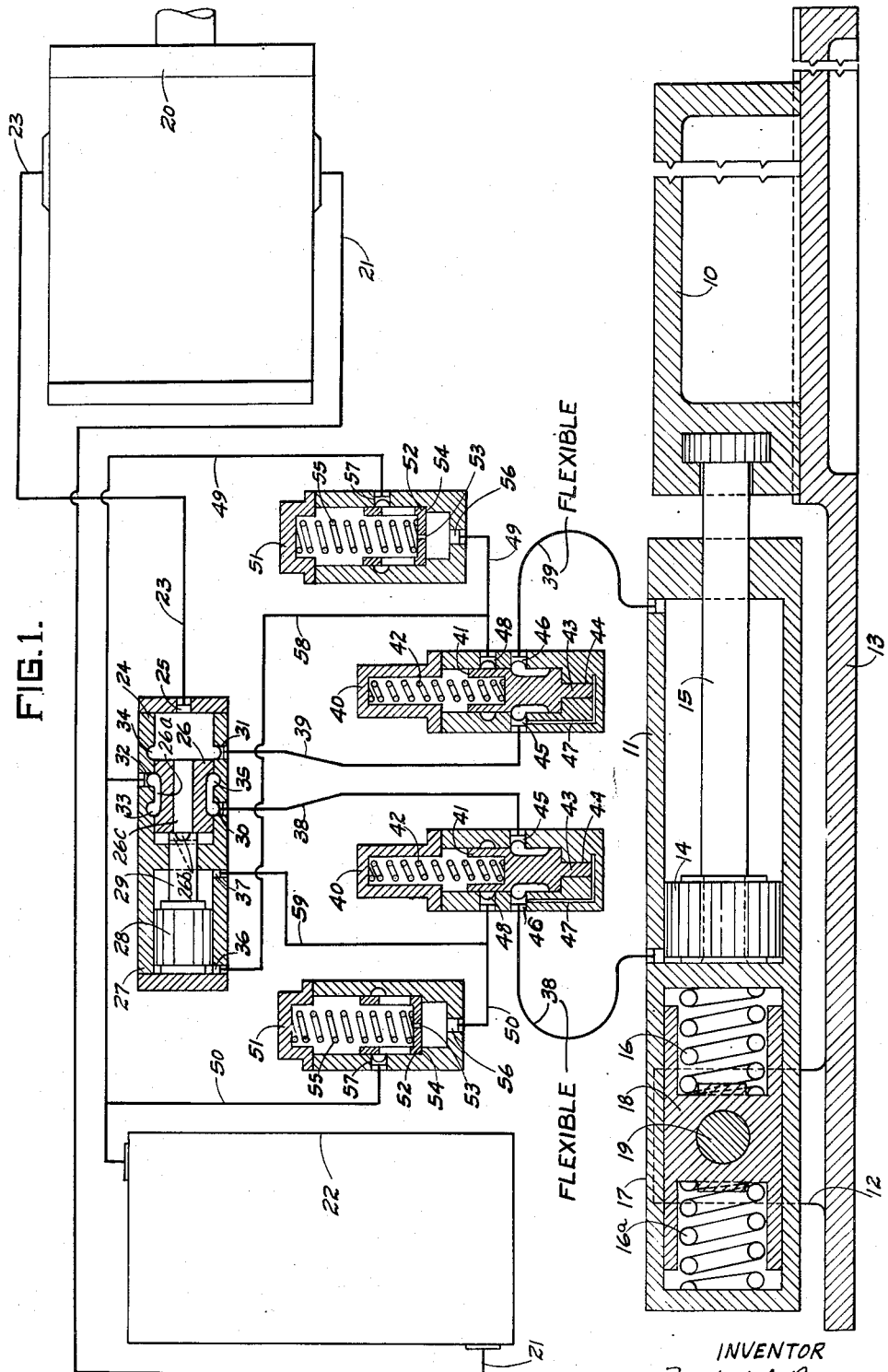
INVENTOR
Frederick B. Miller.

Oct. 21, 1952        F. B. MILLER        2,614,388
POWER TRANSMISSION
Filed Jan. 8, 1948        2 SHEETS—SHEET 2
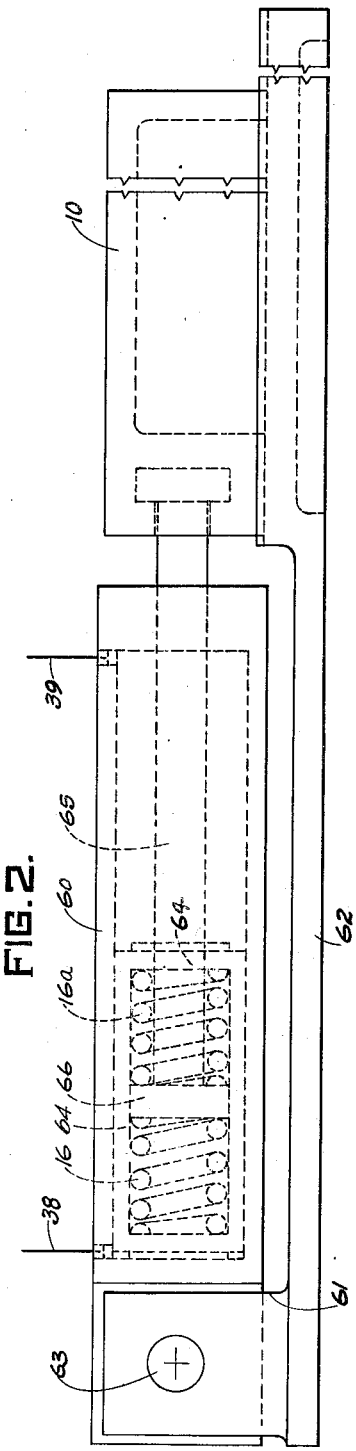
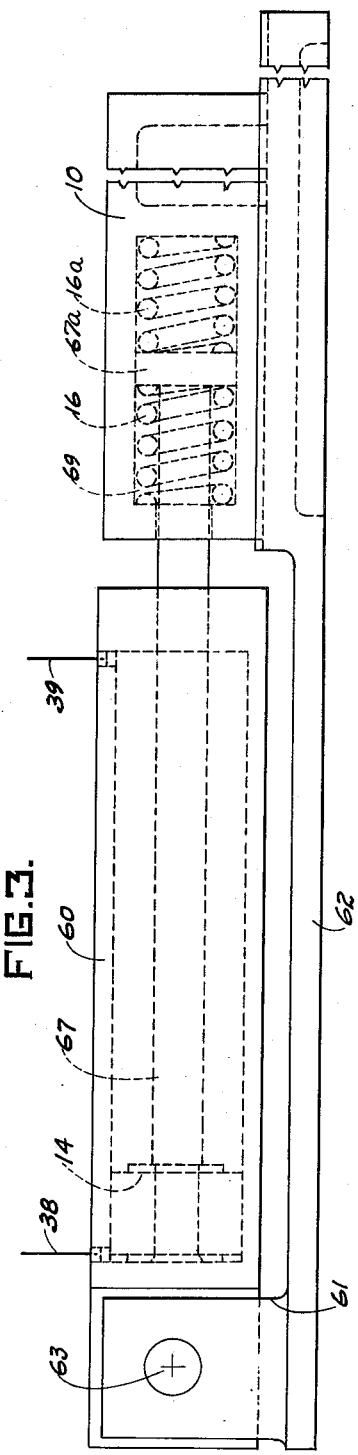
INVENTOR
Frederick B. Miller.

Patented Oct. 21, 1952

2,614,388

UNITED STATES PATENT OFFICE 2,614,388

POWER TRANSMISSION

Frederick B. Miller, Chicago, Ill.

Application January 8, 1948, Serial No. 1,160

6 Claims. (Cl. 60—52)

1

This invention relates to power transmissions, particularly to those of the type comprising two or more fluid translating devices, one of which functions as a continuously driven fixed displacement pump and another as a fluid motor.

This invention is more particularly concerned with providing means for driving a reciprocating productive element employed in machines for planing, shaping, screening, conveying, etc., or in a mining machine employing a reciprocating wedge plate for breaking down material to be mined as shown and described in my copending application Serial No. 676,662 filed June 14, 1946.

The usual planer has a table on which the material to be machined is carried for continuous reciprocating movement during the machining operation. For purposes of illustration, the invention will be shown applied to a planer having a table but it is to be understood that the invention is not to be limited to such use.

There have been numerous hydraulic transmission systems designed for reciprocating a table, many of them requiring mechanical means for actuating a valve for directing and releasing fluid to and from opposite ends of a cylinder provided with a piston adapted to reciprocate the table.

One object of the invention is to provide a power transmission system with a novel pressure operated valve for directing and releasing fluid to and from opposite ends of a cylinder provided with a piston adapted to reciprocate a table.

Another object is to provide a power transmission system embodying a motor having resilient means adapted to yield space between the end of the motor cylinder and the end of the motor piston for absorbing fluid directed into the cylinder during the deceleration and acceleration periods of the table at the end of each stroke, whereby the flow of the fluid from a continuously driven fixed displacement pump is not interrupted or the working pressure of the fluid exceeded during said periods.

Another object is to provide a power transmission system embodying a motor having resilient means adapted to yield space between the end of the motor cylinder and the end of the motor piston for absorbing fluid directed into the cylinder when the table is being decelerated and accelerated at the end of each stroke whereby the working pressure of the fluid is not exceeded and which accordingly protects the pressure operated selector valve so that the same is not operated during the accelerating and decelerating periods.

2

A further object is to provide a power transmission system embodying a motor having a piston reciprocally mounted in a cylinder and having resilient means adapted to yield space between the end of the cylinder and the end of the piston for absorbing fluid directed into the cylinder when the table is being decelerated and accelerated whereby the resilient means in conjunction with the fluid absorbed between the end of the cylinder and the end of the piston serves to effect smooth deceleration and acceleration of the table.

A still further object is to provide a power transmission with a motor that does not require a mechanically operated valve gear.

These and other objects will be apparent after referring to the accompanying drawings in which:

Figure 1 is a diagrammatic view of an hydraulic power transmission system embodying a preferred form of the present invention;

Figures 2 and 3 are modifications of the motor showing the resilient means in different positions from that shown in Figure 1.

Since the planing machine is not a part of the present invention, only the table 10 therefore is shown. The hydraulic motor comprises a motor cylinder 11 resiliently connected to a pair of lugs 12, 12 integral with the base 13 and a motor piston 14 reciprocally mounted in the motor cylinder 11 connected to the table 10 by the rod 15. The resilient means shown in Figure 1 consists of the springs 16, 16a seated in the opposite ends of the yoke 17 integral with the motor cylinder 11 and a bearing block 18 interposed between the springs 16, 16a. The bearing block 18 is journalled on a pin 19 fixed to the lugs 12, 12 integral with the base 13.

A continuously driven fixed displacement pump 20 (driven by source of power not shown) has a suction line 21 connected to a fluid supply tank 22 and a discharge line 23 connected to the inlet 25 of the selector valve 24.

The selector valve 24 having an inlet 25 and openings 30, 31 and 32 connected with ports 33, 34 and 35, respectively, is provided with a spool 26 including a stem 29 connected to a pilot piston 28 mounted in a pilot cylinder 27 with openings 36 and 37. Fluid directed into the pilot cylinder 27 through the openings 36 and 37 alternately imparts reciprocating movement to the spool 26 relative to the ports 33, 34 and 35, whereby fluid is directed and released to and from the opposite ends of the motor cylinder 11 alternately.

Lines 38 and 39 connect the openings 30 and 31 in the selector valve with the backward and forward end of the cylinder 11 respectively. A relief valve 40 is provided in each of the lines 38 and 39.

The relief valve 40, having an inlet 45 and an outlet 46, is provided with a spring 42 seated in a spool 41 and a plunger 43 in a bore 44 adjacent to the end of the spool. Flow of fluid through the relief valve 40 exceeding the working pressure causes fluid under pressure to be diverted through the duct 47 to the bore 44 and against the plunger 43, whereby pressure is exerted against the spring 42 and thereby position the spool 41 in relation to the relief opening 48 for release of the fluid.

The tank return lines 49 and 50 are each connected to the opening 48 in each of the relief valves 40, 40. A pressure valve 51 is provided in each of the return lines 49 and 50.

The pressure valve 51 has an inlet 56 and an outlet 57 and is provided with a spring 55 seated in a plunger 52, with an orifice 53 in the end of the plunger adjacent the inlet 56. Fluid directed into the inlet 56 moves the plunger 52 against the spring 55 a predetermined distance from its seat 54, whereby the outlet 57 is opened for flow of the fluid through the pressure valve 51. The orifice 53 through the center of the plunger 52 serves to by-pass the fluid trapped between the seat 54 and the outlet 57 whereby fluid under pressure is retained in the pressure valve for a predetermined time interval after the momentary flow of fluid through the pressure valve is cut off. Fluid retained under pressure in the pressure valve for a predetermined time interval is diverted to the pilot cylinder 27 of the selector valve 24 for imparting movement to the spool 26.

In operation the continuously driven fixed displacement pump 20 draws fluid from the tank 22 through the suction line 21 and discharges the fluid through the pump discharge line 23 to the selector valve 24. The spool 26 of the selector valve 24 is positioned in relation to the ports 33, 34 and 35, as shown in Figure 1, with the port 34 being open for flow of the fluid from the pump 20 to the forward end of the motor cylinder 11 and the port 33 being open for release of fluid from the backward end of the motor cylinder 11 to the tank 22. Fluid from the pump 20 to the forward end of the motor cylinder 11 flows from the pump 20 through the discharge line 23 into the selector valve 24 from whence the fluid flows through the relief valve 40 provided in the said line 39 connecting the port 34 with the forward end of the motor cylinder 11. Release of fluid from the backward end of the motor cylinder 11 to the tank flows through relief valve 40, provided in line 38 connecting the backward end of the motor cylinder 11 with the port 33 in the selector valve 24 and from whence the fluid flows into the groove 26a of the spool 26 to the opening 32 and through line 49 to the tank 22. Flow of the fluid directed to the forward end of the motor cylinder 11 and released from the backward end of the motor cylinder 11 as described causes the table 10 to be moved to the retracted position shown in Figure 1, with the backward end of motor piston 14 abutting the backward end of the motor cylinder 11. By reason of the backward end of the motor piston 14 abutting the backward end of the motor cylinder 11, the pressure in the line 39 exceeds the working pressure, causing fluid to escape from relief valve 40, provided in line 39. Fluid escaping from the relief valve 40 flows through the pressure valve 51 in line 49 connecting the relief opening 48 of the relief valve 40 with tank 22. Fluid flowing through the pressure valve 51 causes movement of the plunger 52 against the spring 55. The pressure fluid at the pressure required to move the plunger 52 against the spring 55 is diverted through the line 58 to the opening 36 in the pilot cylinder 27 and against the pilot piston 28 to reverse the position of the spool 26 in relation to the ports 33, 34 and 35, whereby the port 33 is now opened for flow of fluid from the pump 20 to the backward end of the motor cylinder 11 and the port 34 is opened for release of fluid from the forward end of the motor cylinder 11 to the tank 22. Fluid from the pump 20 to the backward end of the motor cylinder 11 flows from the pump 20 through the discharge line 23 into the selector valve 24 and through the orifices 26b in the longitudinal bore 26c of the spool 26 to the opposite end of the selector valve 24 from whence the fluid flows through the port 33 and through the relief valve 40 provided in the line 38 connecting the port 33 with the backward end of the motor cylinder 11. Released fluid from the forward end of the motor cylinder 11 flows through the relief valve 40 provided in the line 39 connecting the forward end of the motor cylinder 11 with the port 34 in the selector valve 24 from whence the fluid flows into the groove 26a of the spool 26 to the opening 32 and through the line 49 to the tank 22. By reason of spool 26 being actuated as described to reverse the direction of the flow of fluid from the forward end of the motor cylinder 11 to the backward end of the motor cylinder 11, reversal in direction of travel of the table 10 results.

It is necessary to provide means to prevent actuation of spool 26 during the decelerating and accelerating periods of the motor piston and which occur at the end of each stroke. The invention provides a resilient mounting for the power cylinder 11 which includes the coil springs 16 and 16a. Interposed between the springs 16, 16a seated in the opposite ends of yoke 17, integral with the backward end of the motor cylinder 11, is a bearing block 18 journaled on the pin 19 fixed to the lugs 12, 12 integral with the base 13, thus providing an anchor for the resilient connection whereby the motor cylinder 11 is adapted to yield rearwardly relative to the motor piston 14 when the abutting backward ends of the motor cylinder 11 and the motor piston 14 are being separated by the flow of fluid being directed into the backward end of the motor cylinder 11, thus causing spring 16 to compress and the spring 16a to expand. The action of the pressure fluid is to cause the table to be accelerated in a forward direction. The fixed displacement of fluid from the continuously driven fixed displacement pump 20 is absorbed by the resulting space provided by the separation of the rear end of the motor cylinder 11 and the motor piston 14, which prevents the fluid in line 38 from exceeding the working pressure, whereby the relief valve 40 in line 38 is protected against being actuated, and thus the spool 26 is prevented from being repositioned in relation to ports 33, 34 and 35 of the selector valve 24. Since the spool 26 is not repositioned, reversal in the direction of the flow of fluid to the backward end of the motor cylinder 11 and reversal in the direction of the flow of fluid from the forward end of the motor cylinder 11 is prevented during the periods the table is being accelerated and decelerated in a forward direction. Accordingly, the travel of the table 10 is not interrupted. Reversal in the direction of the travel of the table 10 at the forward end of the stroke is accomplished in the same manner as that described for the reversal in the direction of travel of the table 10 at the rear end of the stroke. Deceleration and acceleration of the table 10 in both directions is accordingly controlled by reason of table 10 being adapted to yield relative to the motor cylinder 11 when the ends of the motor piston 14 and the motor cylinder 11 abut, as shown in Figure 1, whereby the motor cylinder 11 is adapted to yield relative to the motor piston 14 when fluid is being directed into the motor cylinder 11, causing the abutting ends of the motor cylinder 11 and the motor piston 14 to separate for absorbing displacement of fluid from the continuously driven fixed displacement pump 20. Thus the resilient connection of the motor cylinder is a major improvement and is necessary to successful control of the operation of the automatic selector valve 24 during the decelerating and accelerating periods of the table.

In Figure 2 I have disclosed a modified form of the motor. According to this embodiment, the motor cylinder 60 is connected to a pair of lugs 61, 61, integral with the base 62, by the pin 63. A motor piston 64 is reciprocally mounted in the motor cylinder 60. The motor piston 64 is resiliently connected to a piston rod 65 connected to the table 10. Means for resiliently connecting the piston rod 65 with the motor piston 64 comprises the flanged end 66 of the piston rod 65 which is interposed between the springs 16, 16a seated against the opposite ends of the cylindrical pocket in motor piston 64.

In operation the modified form of the motor shown in Figure 2, is provided with the tank 22, pump 20, selector valve 24, relief valves 40, 40 and pressure valves 51, 51 as shown for the motor in Figure 1. The selector valve 24 is adapted to direct fluid to the forward end of the motor cylinder 60 and causes the table 10 to be moved to retracted position as shown in Figure 2, whereby the backward end of the motor piston 64 abuts the backward end of the motor cylinder 60. The backward end of the motor piston 64 abutting the backward end of the motor cylinder 60 causes the fluid directed into the forward end of the motor cylinder 64 through the line 39 to exceed a predetermined working pressure, thus causing fluid to escape from the relief valve 40 provided in line 39. Fluid escaping from relief valve 40 is diverted to the pilot cylinder 27 and against the pilot piston 28 for positioning the spool 26 in relation to the ports 33, 34 and 35 whereby the port 33 is opened for flow of fluid from the pump 20 to the backward end of the motor cylinder 60, and the port 34 is opened for release of fluid from the forward end of the motor cylinder 60 to tank 22 as described for the motor shown in Figure 1. By actuation of the spool 26 as described, reversal in the direction of flow of the fluid is effected when the motor piston 64 and thus table 10 reach a dead center position and which results in reversing the direction of travel of the motor piston and the table.

Interposed between the springs 16, 16a, seated against the opposite ends of the cylindrical pocket provided in the motor piston 64 is the flanged end 66 of the piston rod 65 connected to the table 10. The flanged end 66 of the piston rod being interposed between the springs 16, 16a, the motor piston 64 is adapted to yield relative to the motor cylinder 60 when the abutting backward ends of the motor cylinder 60 and the motor piston 64 are being separated by the flow of fluid through line 38 into the backward end of the motor cylinder 60. The pressure fluid causes the spring 16 to compress and spring 16a to expand preparatory to forward accelerating movement of motor piston 64. The fixed displacement of fluid from the continuously driven fixed displacement pump 20 being absorbed by the space resulting from the separation of the motor cylinder 60 and the motor piston 64, prevents the fluid in line 38 from exceeding the working pressure, whereby the relief valve 40 provided in line 38 is protected against being actuated, thereby obtaining the same results heretofore stated for the motor shown in Figure 1. Accordingly, in Figure 2 the motor piston is resiliently connected to its piston rod, whereas in Figure 1 the motor cylinder is resiliently connected to a fixed support. Both forms of the invention accomplish similar results, that of preventing operation of the selector valve 24 during the accelerating and decelerating periods of the motor piston in both directions. However, at the dead center positions of the motor piston, the fluid automatically exceeds the predetermined working pressure and the selector valve 24 is actuated to reverse the position of the spool 26 to reverse the flow of pressure fluid and effect a reversal in the direction of travel of the table.

In Figure 3 is disclosed a further modified form of the invention consisting of the motor cylinder 60 connected to a pair of lugs 61, 61 integral with the base 62 by the pin 63. A motor piston 14 is reciprocally mounted in the motor cylinder 60, the motor piston 14 being fixed to a piston rod 67 resiliently connected to the table 10. Means for resiliently connecting the piston rod 67 with the table 10 comprises the flanged end 67a of the piston rod 67 which is interposed between the springs 16, 16a seated against the opposite ends of the cylindrical pocket in the table 10.

The modified form of the motor shown in Figure 3, is provided with the tank 22, pump 20, selector valve 24, relief valves 40, 40 and pressure valves 51, 51 as shown for the motor in Figure 1. The selector 24 being positioned to direct fluid to the forward end of the motor cylinder 60 causes the table 10 to be moved to retracted position as shown in Figure 3, whereby the rear end of the motor piston 14 abuts the rear end of the motor cylinder 60. The rear end of motor piston 14 abutting the rear end of motor cylinder 60 causes the fluid directed into the forward end of the motor cylinder 60 through the line 39 to exceed the working pressure, thus causing fluid to escape from relief valve 40 in line 39. Fluid escaping from relief valve 40 is diverted to the pilot cylinder 27 and against the pilot piston 28 for positioning the spool 26 in relation to the ports 33, 34 and 35, whereby the port 33 is opened for flow of fluid from pump 20 to the rear end the motor cylinder 60 and the port 34 is opened for release of fluid from the forward end of the motor cylinder 60 to the tank 22. By reason of the spool 26 being actuated, reversal in the direction of flow of the fluid is effected which results in reversal in direction of travel of table 10.

The hydraulic reciprocating motor of the invention is automatic in operation, since at the end of each stroke when the motor piston reaches dead center position the pressure of the fluid driving the piston is momentarily increased due to the well known ram effect. This momentary increase in pressure is utilized in actuating the selector valve and a reversal in the position of the spool 26 reverses the flow of fluid to the power cylinder so that the motor piston is caused to reverse its direction of travel. The ram effect is sufficient to cause momentary increase in pressure of the fluid to considerably above the working pressure and such is the case notwithstanding the resilient connections as disclosed in Figures 1, 2 and 3. The purpose and function of the resilient connections is to prevent inadvertent actuation of the selector valve such as might otherwise take place during the decelerating and accelerating periods of the motor piston.

Referring again to Figure 3, the coil springs 16 and 16a are seated against the opposite ends of the cylindrical pocket provided by the table 10. Interposed between the springs is the flanged end 67a of the piston rod 67 fixed to the motor piston 14. The flanged end 67a of the piston 67 being interposed between the springs 16 and 16a, the motor piston 14 is adapted to yield relative to the table 10 when the abutting ends of the motor piston and motor cylinder 60 are being separated by pressure fluid directed into the motor cylinder through either line 38 or 39. The resilient connection of the table to the piston rod constitutes structure substantially similar to that described with respect to Figures 1 and 2 and the structure operates in much the same manner to accomplish the same results. During the accelerating period of the motor piston and also during its decelerating period the resilient springs 16 and 16a will yield, providing sufficient extra or additional space within the motor cylinder so that the pressure of the driving fluid is prevented from increasing to an extent which would exceed the working pressure. Accordingly, the relief valves are not actuated and it follows that the selector valve is also not actuated. The resilient connections as provided by the invention also function to smooth out the accelerating period of the motor piston and render the same more uniform and the decelerating period at the other end of the stroke is likewise improved in a similar manner.

While I have shown and described several specific embodiments of my invention, it will be understood that I do not wish to be limited exactly thereto, since various modifications may be made without departing from the scope of my invention as defined in the following claims.

What I claim is:

1. In an hydraulic power transmission having a base, a continuously driven fixed displacement pump forming a source of fluid, a productive element mounted for reciprocating movement relative to said base, a motor adapted to reciprocate said productive element, said motor comprising a motor cylinder provided with a resilient connection to said base and a motor piston reciprocably mounted in said motor cylinder, said motor piston being connected to said productive element, said resilient connection being adapted to yield during the deceleration and acceleration period of said productive element at the end of each stroke, a selector valve connected with said pump, said selector valve being provided with a spool adapted to be actuated for directing and releasing fluid to and from the opposite ends of said motor cylinder alternately to impart reciprocating movement to said productive element, means for actuating said spool comprising a pilot cylinder provided with a pilot piston connected to said spool, a relief valve connected to each end of said motor cylinder, a pressure valve connected to each of said relief valves, the arrangement being such that when fluid alternately directed into the opposite ends of said motor cylinder exceeds the working pressure at the ends of each stroke, by reason of said motor piston abutting the opposite ends of said motor cylinder alternately fluid is caused to escape from each of said relief valves alternately, said fluid escaping from said relief valves alternately flows through said pressure valves alternately, said pressure valves being adapted to divert fluid under pressure to opposite ends of said pilot cylinder alternately for actuating said spool at the end of each stroke, and the fluid directed between the abutting ends of said motor cylinder and said motor piston during said deceleration and acceleration period of said productive element causing said resilient connection to yield whereby said abutting ends of said motor cylinder and said motor piston separate to provide space for absorbing the displacement of fluid from said pump during said deceleration and acceleration period of said productive element, whereby the working pressure of the fluid is not exceeded, thus protecting said spool from being actuated from its last mentioned position during said deceleration and acceleration period of said productive element.

2. In an hydraulic power transmission having a base, a fixed displacement source of fluid, a productive element mounted for reciprocating movement relative to said base, a motor adapted to reciprocate said productive element, said motor comprising a motor cylinder and a motor piston reciprocably mounted in said motor cylinder, a resilient connection intermediate said base and said productive element, said resilient connection being adapted to yield during the deceleration and acceleration period of said productive element at the end of each stroke, a selector valve connected with said fixed displacement source of fluid, said selector valve being provided with a spool adapted to be actuated for directing and releasing fluid to and from the opposite ends of said motor cylinder alternately to impart reciprocating movement to said productive element, means for actuating said spool comprising a pilot cylinder provided with a pilot piston connected to said spool, a relief valve connected to each end of said motor cylinder, the arrangement being such that when fluid alternately directed into the opposite ends of said motor cylinder exceeds the working pressure at the end of each stroke, by reason of said motor piston abutting the opposite ends of said motor cylinder alternately, fluid is caused to escape from each of said relief valves alternately, said fluid escaping from said relief valves is alternately diverted under pressure to the opposite ends of said pilot cylinder for actuating said spool at the end of each stroke, and the fluid directed between the abutting ends of said motor cylinder and said motor piston during said deceleration and acceleration period of said productive element causing said resilient connection to yield, whereby said abutting ends of said motor cylinder and said motor piston separate to provide space for absorbing the displacement of fluid from said fixed displacement source of fluid during said deceleration and acceleration period of said productive element, whereby the working pressure of the fluid is not exceeded thus protecting said spool from being actuated from its last mentioned position during said deceleration and acceleration period of said productive element.

3. In an hydraulic power transmission having a base, a continuously driven fixed displacement pump forming a source of fluid, a productive element mounted for reciprocating movement relative to said base, a motor adapted to reciprocate said productive element, said motor comprising a motor cylinder provided with a resilient connection to said base and a motor piston reciprocally mounted in said motor cylinder, said motor piston being connected to said productive element, said resilient connection being adapted to yield during the deceleration and acceleration period of said productive element at the end of each stroke, a selector valve connected with said pump, said selector valve being provided with a spool adapted to be actuated for directing and releasing fluid to and from the opposite ends of said motor cylinder alternately to impart reciprocating movement to said productive element, means for actuating said spool comprising a pilot cylinder provided with a pilot piston connected to said spool, a relief valve connected to each end of said motor cylinder, the arrangement being such that when fluid alternately directed into the opposite ends of said motor cylinder exceeds the working pressure at the end of each stroke by reason of said motor piston abutting the opposite ends of said motor cylinder alternately, fluid is caused to escape from each of said relief valves alternately, fluid escaping from said relief valves alternately being diverted under pressure to the opposite ends of said pilot cylinder alternately for actuating said spool at the end of each stroke, and the fluid directed between the abutting ends of said motor cylinder and said motor piston causing said resilient connection to yield whereby said abutting ends of said motor cylinder and said motor piston separate to provide space for absorbing the displacement of fluid from said pump during said deceleration and acceleration period of said productive element, whereby the working pressure of the fluid is not exceeded thus protecting said spool from being actuated from its last mentioned position during said deceleration and acceleration period of said productive element.

4. In an hydraulic power transmission having a base, a fixed displacement source of fluid, a productive element mounted for reciprocating movement relative to said base, a motor adapted to reciprocate said productive element, said motor comprising a motor cylinder and a motor piston reciprocally mounted in said motor cylinder, a resilient connection intermediate said base and said productive element, said resilient connection being adapted to yield during the deceleration and acceleration period of said productive element, a selector valve connected with said fixed displacement source of fluid, said selector valve being provided with a spool adapted to be actuated for directing and releasing fluid to and from the opposite ends of said motor cylinder alternately to impart reciprocating movement to said productive element, means for actuating said spool comprising a pilot cylinder provided with a pilot piston connected to said spool, a relief valve connected to each end of said motor cylinder, the arrangement being such that when fluid alternately directed into the opposite ends of said motor cylinder exceeds the working pressure at the end of each stroke by reason of said motor piston abutting the opposite ends of said motor cylinder alternately fluid is caused to escape from each of said relief valves alternately, fluid escaping from said relief valves alternately being diverted under pressure to the opposite ends of said pilot cylinder alternately for actuating said spool at the end of each stroke, and the fluid directed between the abutting ends of said motor cylinder and said motor piston causing said resilient connection to yield whereby said abutting ends of said motor cylinder and said motor piston separate to provide space for absorbing the displacement of fluid from said fixed displacement source of fluid during said deceleration and acceleration period of said productive element, whereby the working pressure of the fluid is not exceeded thus protecting said spool from being actuated from its last mentioned position during said deceleration and acceleration period of said productive element.

5. In an hydraulic power transmission, the combination including a base, a fixed displacement source of pressure fluid, a productive element mounted for reciprocating movement relative to the base, a motor adapted to reciprocate said productive element, said motor comprising a motor cylinder and a motor piston reciprocally mounted in said motor cylinder, selective valve means having connection with said fixed displacement source of fluid, fluid conducting means respectively connecting the selective valve means with opposite ends of the motor cylinder for alternately delivering pressure fluid to and venting said fluid from respective ends of the cylinder as determined by selective valve means, whereby reciprocating movement is imparted to the motor piston and thus to said productive element, the said pressure fluid being delivered to the motor cylinder momentarily attaining an excessive pressure such as to exceed the working pressure at the end of each stroke of the motor piston, control means responsive to said excessive pressure at the end of each stroke of the motor piston and operative to actuate the selective valve means to reverse the flow of pressure fluid, whereby pressure fluid is delivered to that end of the cylinder previously vented and the opposite end is vented to cause a return stroke of the piston, a resilient connection intermediate said base and said productive element, said resilient connection being adapted to yield during the deceleration and acceleration periods of said motor piston at the end of each stroke, whereby as a result of said resilient connection the pressure fluid being directed between adjacent ends of said motor piston and said motor cylinder during the deceleration and acceleration periods effects separation thereof to provide additional space for absorbing fluid from said fixed displacement source of fluid, thus preventing the occurrence of an excessive pressure exceeding the working pressure except at the end of each stroke of the motor piston.

6. In an hydraulic power transmission having a base, a fixed displacement source of fluid, a productive element mounted for reciprocating movement relative to said base, a motor adapted to reciprocate said productive element, said motor comprising a motor cylinder and a motor piston reciprocally mounted in said motor cylinder, said motor piston being provided with ends adapted to abut respectively the opposite ends of said motor cylinder, a resilient connection intermediate said base and said productive element, said resilient connection being adapted to yield during the deceleration and acceleration period of said productive element at the end of each stroke, a selector valve connected with said fixed displacement source of fluid, said selector valve being provided with a spool adapted to be actuated for directing and releasing fluid to and from the opposite ends of said motor cylinder alternately to impart reciprocating movement to said productive element, said resilient connection being adapted to yield during said deceleration and acceleration period of said productive element by reason of fluid being directed between said abutting ends of said motor piston and said motor cylinder which causes said abutting ends of said motor piston and said motor cylinder to separate to provide space for absorbing the displacement of fluid from said fixed displacement source of fluid during said deceleration and acceleration period of said productive element, whereby said displacement of fluid from said fixed displacement source of fluid is not interrupted and deceleration and acceleration of said productive element is effected in a smooth and uniform manner.

FREDERICK B. MILLER.

REFERENCES CITED

The following references are of record in the file of this patent:

UNITED STATES PATENTS

| Number | Name | Date |
|---|---|---|
| 387,234 | Hutchinson | Aug. 7, 1888 |
| 1,952,690 | Strom | Mar. 27, 1934 |
| 2,069,122 | Weaver | Jan. 26, 1937 |
| 2,262,432 | Rodder | Nov. 11, 1941 |
| 2,298,457 | Berges | Oct. 13, 1942 |
| 2,393,324 | Joy | Jan. 22, 1946 |
| 2,396,052 | Light | Mar. 5, 1946 |
| 2,482,792 | Owen | Sept. 27, 1949 |